Dec. 29, 1964   C. L. LAPHAM   3,163,104
METHOD AND MEANS FOR CONTINUOUS PLASTIC LAMINATION
Filed June 21, 1960   3 Sheets-Sheet 1

INVENTOR.
CLARENCE L. LAPHAM
BY Harry R. Lubcke
AGENT

Dec. 29, 1964           C. L. LAPHAM           3,163,104

METHOD AND MEANS FOR CONTINUOUS PLASTIC LAMINATION

Filed June 21, 1960           3 Sheets-Sheet 2

INVENTOR.
CLARENCE L. LAPHAM
BY Harry R. Lubcke
AGENT

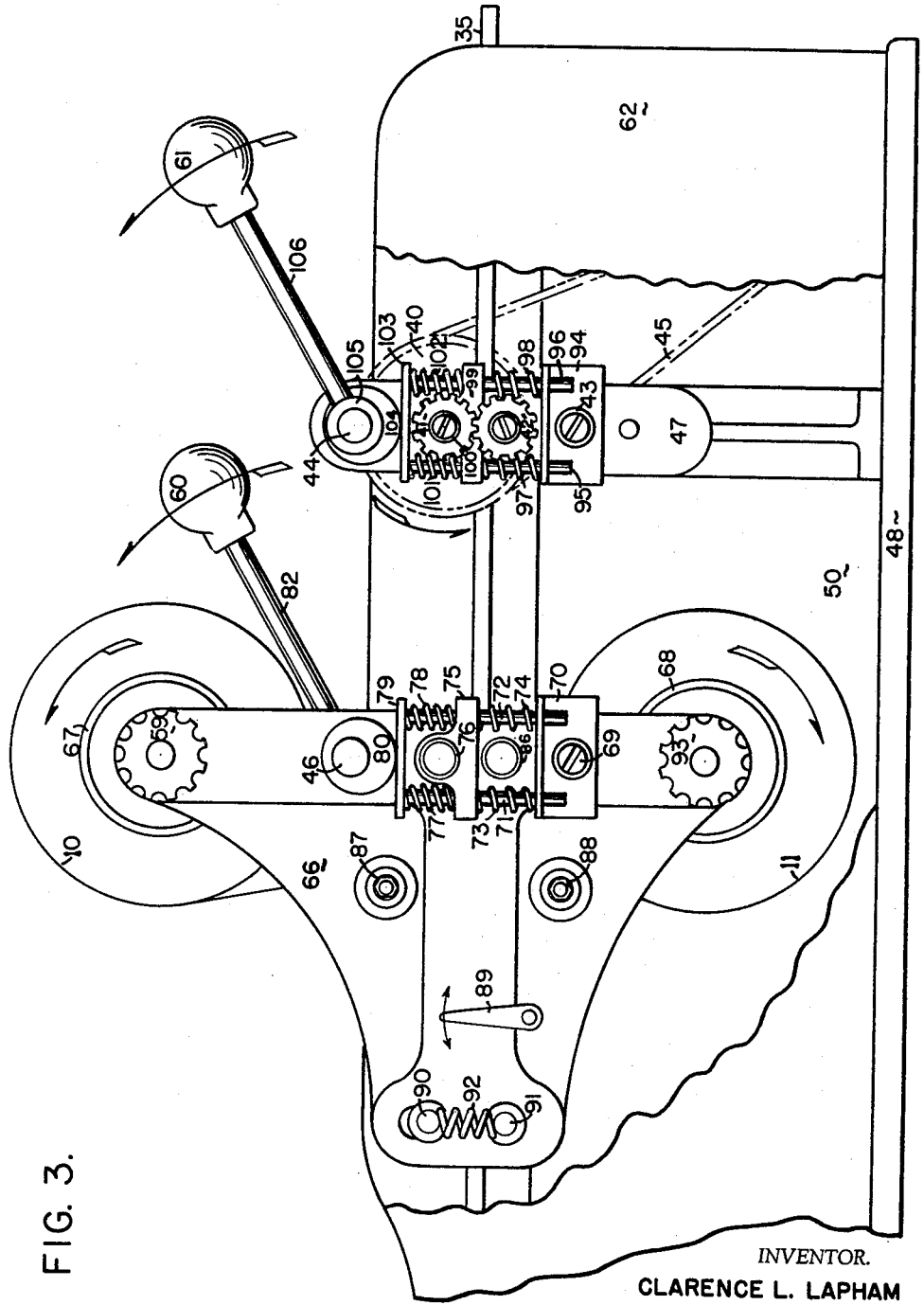

United States Patent Office 3,163,104
Patented Dec. 29, 1964

3,163,104
METHOD AND MEANS FOR CONTINUOUS
PLASTIC LAMINATION
Clarence L. Lapham, La Canada, Calif., assignor to Plasticmaster Corporation, Los Angeles, Calif., a corporation of California
Filed June 21, 1960, Ser. No. 37,698
2 Claims. (Cl. 100—38)

My invention relates to a method and means for continuously producing a cohesive laminated strip and particularly to a method and means for protectively encasing selected flat subject material.

While a wide field of application exists for plastic encapsulated items such encapsulation reaches a high point of utility in providing identification cards and similar articles with a thin transparent plastic coating so that these are protected from wear and from tampering with the subject material thereof.

The mode of processing and the devices that have previously been employed for this purpose have had inherent disadvantages.

Where hot rollers have been employed to accomplish the laminating process it is well known to those who practice this art that the rollers cool inordinately rapidly when material is repeatedly processed and that it is necessary for the operator to stop processing after every three or four operations and wait for the hot rolls to again reach proper temperature. The rolls cannot be brought to a higher initial temperature in an attempt to overcome this deficiency, since this results in improper processing because of too much heat and melting of the plastic at the edges.

Furthermore, when hot rollers are employed, the material to be laminated, such as cards, photographs, etc. is not heated prior to the laminating process per se. This subject material removes significant amounts of heat from the hot rolls and is an important factor in requiring the intermittent processing that has been described. The articles may also be encapsulated with excessive moisture therein. This may cause blisters in the work because of the formation of water vapor during processing or alteration of the subject matter during the life of the article because of the prolonged association with moisture.

With the method and means of the prior art it has also been noted that the finished work has a "dish" or other curvature and will not lie flat.

I have been able to overcome all of these shortcomings by a novel mode of processing and a novel arrangement of my invention.

I have found that when the plies of plastic and the materials to be laminated are heated as a combined "sandwich" as a pre-laminated structure prior to the laminating step per se, the process may be carried on as rapidly and as continuously as desired and the work is of superior calibre. Accordingly, I provide a pair of opposed heating platens which ride upon the outer plastic plies prior to the application of pressure to the work. Heating is very largely by conduction and various thicknesses of laminated structure can be accommodated by the riding feature.

Immediately thereafter I accomplish lamination by opposed pressure rollers which in themselves have no heating capability.

Relatively far beyond this assembly I provide another pair of rollers, each of which is driven. These are the only powered rollers in my machine and so insure that the laminating webs of plastic, if not the whole sandwich structure, is in tension during all significant steps in the processing. This has particular importance after the laminating step, in that cooling takes place under tension.

This, I have discovered, results in a uniformly flat product; one devoid of dish, wrinkle or curvature.

An object of my invention is to provide a superior and rapid method of laminating materials.

Another object is to provide simple means for accomplishing my method of laminating as a continuous process.

Another object is to provide means for cooling laminated work under tension.

Another object is to provide means for laminating having versatility as to the thickness of the resulting work.

Other objects will become apparent upon reading the following detailed specification and upon examining the accompanying drawings, in which are set forth by way of illustration and example certain embodiments of my invention for accomplishing my process.

FIG. 3 shows a broken-away side elevation of the same, illustrating particularly the laminating head per se.

Figure 1:
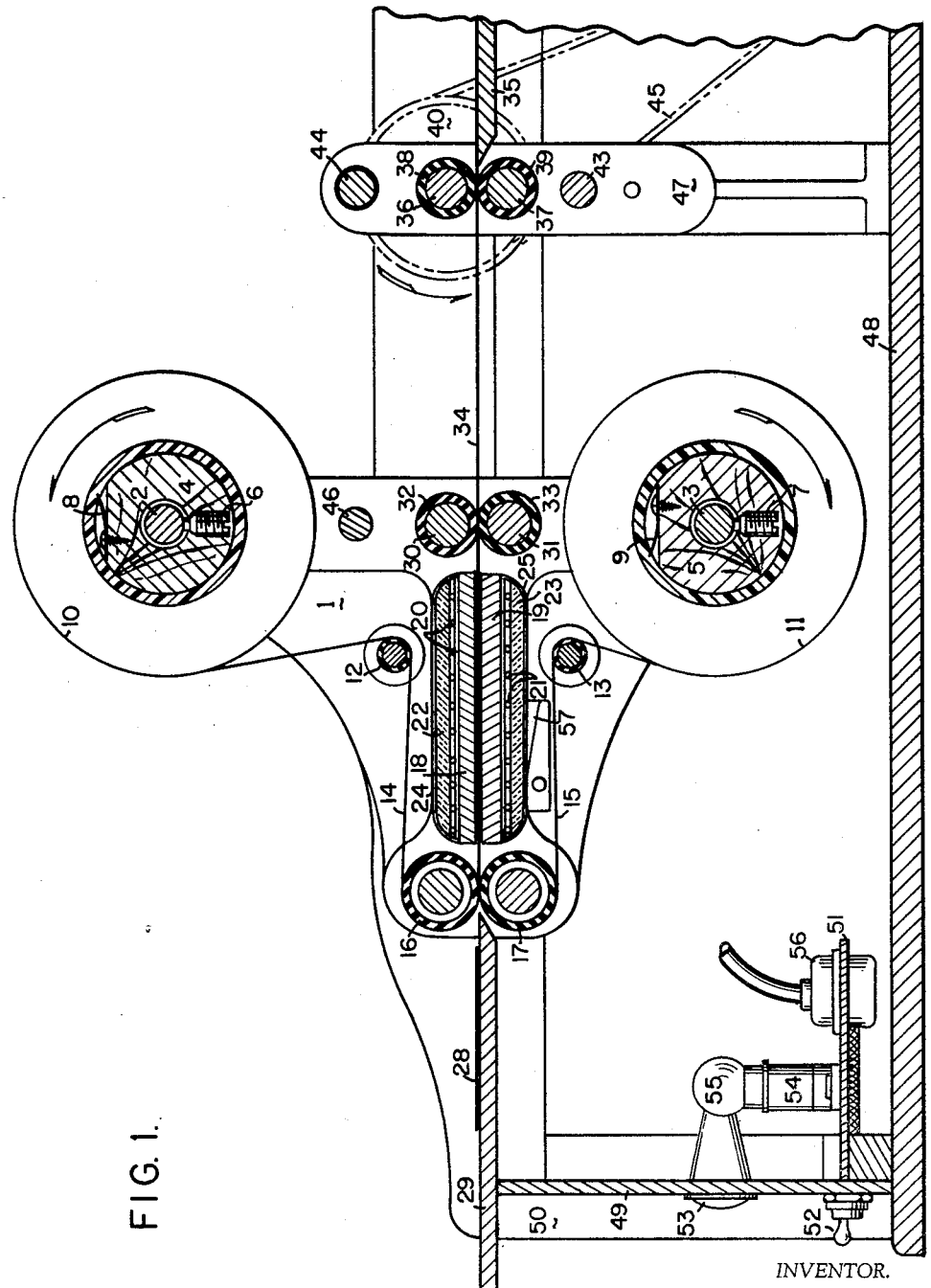
FIG. 1 shows a side sectional elevation through the center of my continuous laminator.

In FIG. 1 numeral 1 indicates one side frame of the laminating head of my apparatus. This is conveniently cast in the three-cornered shape shown in order that the several rolls and other elements may be properly spaced. An upper supply roll spindle 2 forms the support for an upper core spool 4, while these lower elements are identified as 3 and 5, respectively. In these spools are threaded screws 6 and 7, which ride in grooves in the respective shafts and by means of compression springs within each provide a relatively constant friction brake upon the supply rolls. Element 8 is a leaf spring mounted upon the upper core spool and proportioned to bite into the inner tube of the supply roll. This does not allow rotation between the two in the direction of feed, but does allow rotation or translation for adjusting the position of the roll on the shaft and for taking up slack. Element 9 is the corresponding lower leaf spring. Metal shafts 2 and 3 do not rotate, thus the desired friction action is achieved.

The upper supply roll of plastic material 10 becomes the upper covering of the completed work piece. This may be any of the known heat-weldable plastics, such as polyethylene. In practice this material is a few inches wide by a few thousandths of an inch in thickness. It is invariably transparent, although this matter has nothing to do with the processing or machine of my invention. The prior art has found difficulty in laminating with such material over a few thousandths of an inch in thickness because of the increased cooling action on heated rolls. I have found it possible to laminate with material over a 0.001" to 0.010" range on any single machine according to my process. With attention to the requirements for either thin or thick material this range is increased to from 0.0005" to 0.030" at the present known state of the art.

I prefer to employ a plastic film material which in itself is laminated, such as a thickness of four increments of polyethylene to one increment of Mylar. That is, two previously laminated substances are used, the polyethylene being four times as thick as the Mylar. In my processing the polyethylene substance is on the outside of roll 10 and the Mylar is on the inside of each convolution. This causes the Mylar to be on the outside of the finished work, as will later become apparent.

The corresponding lower roll of laminating material is element 11 and it is similarly wound.

An upper idler roller 12 receives the upper laminating material from the upper roll and changes the direction of travel thereof on the order of 90° so that the material will properly flow through the machine. A similar idler roller 13 accomplishes the same purpose upon the lower laminating material. The material of these rollers is not critical. The path of the upper laminating material after leaving the idler roller is identified by numeral 14 and the path of the lower material by 15.

A "sandwich" is formed consisting of the upper laminating material, the subject work-piece and the lower laminating material by upper sandwich roller 16 and lower sandwich roller 17. These rollers are preferably of metal, of which aluminum or polished steel are examples. The outside diameter is conveniently something over an inch. Sleeve bearings, ball bearings, pin bearings, etc. may be employed to journal these rollers to the two sides of the laminating head side frames 1 and 66. The journals are arranged in slots and are spring loaded to accommodate materials of various thicknesses, as will be described in detail in connection with FIG. 3.

The sandwich is heated by upper heating platen 18 and lower heating platen 19. These are of metal of good heat conductivity, such as aluminum or copper, and are arranged to ride upon the materials of the sandwich. In greater detail, the lower platen assembly is secured to the side plates by four screws and the upper assembly is caused to ride on the work by slots in angle pieces that extend down to and beyond the screws. For a greater force than that of gravity the upper assembly may be spring loaded.

The platens extend the width of the working area of the machine. For identification card work this may be of the order of a half foot, but for other purposes this may be as small as a few inches or as large as several feet. The amount of heat absorbed by the work depends, among other things, upon the length of the platen in the direction of the path through the machine and the speed of the material through the machine. In particular, a few inches in length suffices for a processing speed of a few feet per minute. For convenient manual feed of identification cards, etc. a speed of around four or five feet per minute is desirable for processing and a length of the platens of the order of four inches is desirable. This same length is also suitable for very slow processing and up to perhaps nine feet per minute. By an adjustable thermostat to be later described the necessary heat for various speeds in this range can be supplied. At the high processing speeds automatic feeding of individual items is useful, or, of course, if the article being provided with laminated protection is in roll form the matter of feeding is self-automatic.

Electric heating of the platens is made possible by heating elements 20 and 21. These are preferably insulated electrically from the platens by a thin layer of mica and are also bounded on the surface away from the respective platens by mica, after which a relatively thick layer of asbestos or other insulating material 22, 23 is placed in the upper and lower assemblies, respectively. These assemblies are completed by upper and lower platen enclosures 24 and 25. These serve to enclose each assembly, save for the working surface of each platen, and also as structural supports for plural screws to force the heating elements into good thermal contact with the platens. Steel is a suitable material for the platen enclosures.

Element 28 is illustrative of an identification card in the feeding position.

An input table 29 is provided as part of the outer structure to afford convenient placement of the subject matter to be encapsulated. The height of the top surface of the table is made the same as the level of the lower plastic material at the top of roller 17. Regardless of the thickness of the subject matter roll 16 lifts sufficiently against its spring loaded journal arrangement to accept the subject matter. The usual such material is a few thousandths of an inch in thickness. It will be understood that the article being encapsulated is grasped between the two ribbons of encapsulating material and conveyed between the two platens 18 and 19, at which time the whole sandwich is heated.

As soon as the sandwich emerges from the platens lamination occurs at the two laminating rollers 30 and 31. Each rollers is covered with a neoprene heat and oil resisting rubber jacket, 32 and 33, respectively. Each roller may be of the order of one inch in diameter and the neoprene jacket one-eighth inch in thickness. I have found a durometer hardness of 55 desirable. However, a steel, brass or equivalent metallic upper roller (30) may be employed, in which case the neoprene of the lower roller would be softer, the value being in the 40 to 45 range. In the rubber to rubber embodiment a hardness of from 50 to 60 may be used.

The now laminated but still hot sandwich is shown at 34.

This ultimately passes out on discharge table 35. It will be noted that plastic 14 is now on the top of the subject article 28, with the Mylar lamination on the very top and that plastic 15 is on the bottom with the Mylar lamination on the very bottom. A temperature of approximately 200° F. is desirable for plastic laminating. With the Mylar type of laminate the plastic flows slightly as required for the heat welding process but the Mylar does not, giving a dimensional stability to the processing.

Rolls 36 and 37 are the only driven rollers in my device and so pull the materials through the same under tensile stress. These are also neoprene coated and are normally of the same construction as laminating rollers 30, 31, to effect economy in manufacturing. The neoprene is indicated at 38 and 39.

A drive sprocket 40 on the upper drive roller takes a chain drive from the prime mover for my device. This sprocket moves counterclockwise so that the laminated work will be pulled through the machine. An upper drive gear 41 meshes with a lower drive gear 42 to give positive drive of both drive rollers 36 and 37 (see FIG. 3). A structural cross-bar 43 fastens the two drive roller uprights 47 together for necessary rigidity. Shaft 44 holds two eccentric cams for applying pressure to the drive rollers.

Element 45 represents a chain drive, which couples sprocket 40 to one of corresponding pitch on the prime mover, such as an electric motor. The motor and second sprocket have not been shown because of space limitations on FIG. 1, but these are known elements and do not require illustration. For the processing speeds previously mentioned the drive rollers are required to revolve at a speed of the order of ten revolutions per minute. This, of course, dictates the use of an internal gear reducing motor, the armature of which is in the normal thousand of revolution per minute class. Normal variations of feed speed make useful speeds for the drive rollers in the range of from 5 to 15 revolutions per minute. Speeds to 30 revolutions per minute have been employed, but not for manual feeding. It will be understood that a corrugated belt, a train of gears, a V belt and so on may be employed for the motor to drive roller drive.

Element 46 is the actuating shaft for the cams to exert pressure on the laminating rolls. Drive roller upright 47 supports these rollers from the base of the whole machine 48. The base and associated sides may be of sheet metal, aluminum plate or casting, or Masonite or similar structurally sound impregnates or plastics. Front panel 49 supports the controls and indicators of the device, while element 50 is the rear side. The material for these elements is normally the same as that of the base.

On or attached to front panel 49 is sub-panel 51, which supports electrical components, HEAT-ON switch 52, HEAT-ON indicating lens 53, HEAT-ON indicating lamp socket 54, HEAT-ON indicating lamp 55 and input power electrical connection 56.

While the electric power required for embodiments of my invention may vary over wide ranges, a typical embodiment utilizes 500 watts. Of this, 200 watts is consumed by each of the platen heaters 20 and 21 and 100 watts by the motor. The power stated for the heaters represents the maximum amount and demand, since once the platens have reached operating temperature the power is cycled on and off automatically by a thermostat yet be described. For the slow speeds of processing previously mentioned and work of the order of four inches wide as little as 150 watts total for the heaters is sufficient, while for an embodiment operating at the fast speed of processing previously mentioned and with work six inches wide the heater requirement is approximately 700 watts. The voltage may conveniently be 117 volts and the current either alternating or direct as long as the motor accepts either type of energy.

Element 57, in contact thermally with lower platen 19, at one side, is a thermostat. I prefer to connect the two electric heaters 20, 21 in series so that partial operation is not possible should one heater become defective, and the thermostat contacts are connected in series with these. The thermostat is provided with an adjustment, 89, in FIG. 3, which is adjusted to give approximately 220° F. platen temperature for a 200° F. plastic welding temperature. A thermostat may alternately be mounted on the upper platen, and directly thereonto.

Figure 2:
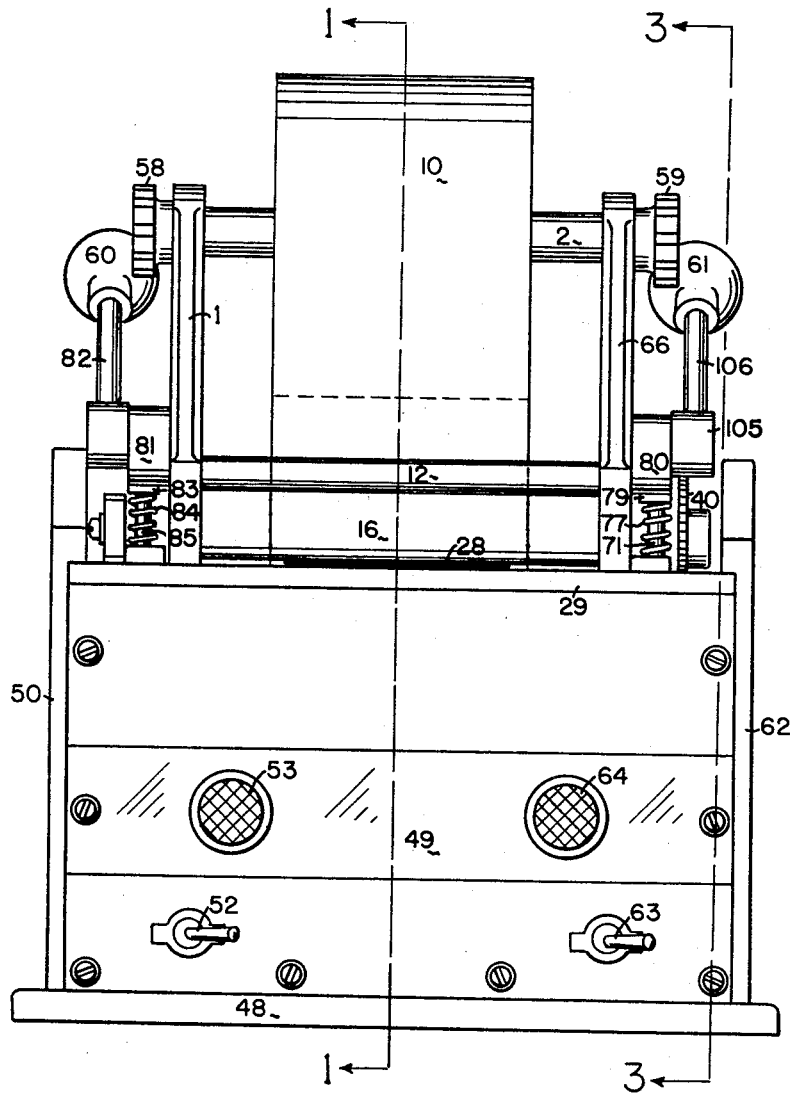
FIG. 2 shows a front elevation of the same.

Referring particularly to FIG. 2, a rear tightening knob 58 and a front tightening knob 59 are shown for the purpose of tightening the supply roll of laminating material for the upper lamination of the finished work. A counterbore in the frame sides 1 and 66 is provided to insure proper alignment by an unskilled operator. A pin is also provided in spindle 2 and this rests in the slot opening from the top of the frame through which the spindle 2 is placed into position, carrying, of course, supply roll 10. This structure is duplicated for lower supply roll 11. The stationary spindles cause the friction unwind arrangement previously described to function.

Knob 60 is provided for manual release of the pressure on the laminating rolls and knob 61 the same for the drive rolls. Numeral 62 identifies the front side which is relatively the same as the back side 50. A processing STOP-START switch 63 connects to the electric motor and so controls the mechanical action of the laminator apparatus. Lens 64, and light accessories not shown, indicate that processing is in progress.

The particular mechanical structure that I have found desirable for accomplishing my process is shown in further detail in FIG. 3. The tube upon which the laminating material is supplied is indicated at the upper roll as 67 and at the lower roll as 68. A screw 69 holds front laminating rolls spring bracket 70 to frame side 66. A front laminating rolls bearing guide rod 71 and the same 72 form a necessary structure for the spring support of these rolls. Two compression springs 73, 74 are provided for separating the two laminating rollers when manual operating knob is moved upward (arrow) to release the pressure on these. The bearing of the upper laminating roller is a part of floating bearing block 75. The bearing proper, 76, may be any of the types previously mentioned. Compression springs 77 and 78 transmit the force exerted upon the assembly by guide rod yoke 79 from eccentric cam 80. This is the major force in the laminating system and because of the relatively narrow contact between the two laminating rollers is in the range of 50 to 100 pounds per square inch at that contact. Accordingly, springs 77 and 78 are relatively strong and stiff in order that the necessary force shall be exerted upon the top roller 32 (FIG. 1). Bottom roller 33 is fixed in bearings to frame 1, 66. Springs 73 and 74 have only a fraction of the stiffness of springs 77 and 78.

The upper part of this spring pressure assembly can be seen in FIG. 2, where it will also be noted that eccentric cams are employed on both sides of the roll; i.e., cams 80 and 81. A pressure release lever 82 completes this aspect of the laminating rolls, save for the duplicate parts at the rear (left in FIG. 2). These are guide yoke 83, laminating pressure spring 84, and bearing guide rod 85. The lower laminating roll bearing proper is 86 in FIG. 3.

The bearings for the upper and the lower idler rollers 12 and 13 are 87 and 88, and may be of any of the types of bearings that have been mentioned. Lever 89 adjusts the thermostat 57 so that either higher or lower temperatures may be obtained. This alters the time on and the time off in a reciprocal manner of the passage of heating electric current. The thermal inertia of the platens is sufficient to provide a relatively constant temperature in spite of the intermittent application of heat energy.

The upper front sandwiching roller shaft extension and bearing assembly 90 is seen to be retained in a vertical slot in plate 66. The lower shaft extension and bearing assembly 91 is fixed. A tension spring 92 insures that the upper roller shall bear upon the work piece (as 28 in FIG. 1). However, only a slight pressure is required here and the force exerted by spring 92 is some value less than one pound. A companion spring is employed on the other side of these rollers.

Tightening knob 93 is for the lower supply roll spindle as knob 59 was for the upper.

The spring pressure assembly for the drive rollers is closely the same as for the previously described laminating rollers. Thus, 94 is the spring angle bracket, 95 and 96 the guide rods, 97 and 98 the relatively weak roller separating springs 99 the floating bearing block, 100 the bearing proper, 101 and 102 the relatively strong compression springs, 103 the guide rod yoke, 104 the front eccentric for imposing pressure on the drive rollers, 105 the hub of the pressure release lever, and 106 the manual pressure release lever for the drive rollers.

Processing is accomplished according to my method by threading the ribbons of plastic material from rolls 10 and 11 around rolls 12 and 13 along paths 14 and 15, around rolls 16 and 17 to initiate the disposition thereof in parallel planes for progress between platens 18 and 19, between laminating pressure rollers 32 and 33, to form the welded laminate 34 and then through drive rollers 38 and 39. At the start of processing of any new rolls of plastic this threading is accomplished first, as a matter of convenience. The platens are then brought to operating temperature, as evidenced by cycling of the thermostat and pressure exerted on both laminating and drive rolls by moving the knobs 60 and 61 to the down position in which these are shown in FIG. 3. The machine is then started by energizing the drive 45 and the subject matter to be laminated, as 28 in FIG. 1, fed into the sandwiching rollers. This material is fed in sufficiently rapidly to leave only a desirable trim space between the individual items of subject matter. Of course, continuous subject matter to be covered with the protective films may also be processed.

It will be understood that variations in processing may take place under my invention, such as providing one or more of the supply spools with two or more ribbons or tapes of plastic or other material employed for providing distinctive identification. The whole is then welded together according to my process.

Similarly, in my preferred means for effecting continuous plastic lamination, modifications may be made in the arrangement, size, proportions and shapes of the elements thereof without departing from the scope of my invention.

Having thus fully described my invention and the manner in which it is to be practiced, I claim:

1. The method of continuously laminating stiff planar articles which comprises the steps of:
   (a) forming a laminatable assembly by bringing together two webs of thermoplastic material with cards therebetween and spaced longitudinally therealong,
   (b) subsequently simultaneously heating both sides of said laminatable assembly including the said cards,
   (c) subsequent to said heating, welding said laminatable assembly by progressively applying pressure to the said laminatable assembly while it is heated, (d) relatively slowly and forceably cooling the laminated assembly subsequent to said welding, and (e) maintaining longitudinal tension upon said laminated assembly with said laminated assembly in an unsupported planar configuration during said cooling step.

2. A continuously operable laminator for forming a coherent structure of plural layers of thermoplastic material and encapsulated subject matter spaced along therein comprising:

(a) means to continuously bring two webs of thermoplastic material into close parallel juxtaposition to receive said subject matter therebetween in spaced longitudinal relation, (b) means to subsequently simultaneously heat both webs of said thermoplastic material including said subject matter therebetween, (c) pressure means disposed relatively closely behind said means to simultaneously heat, to progressively apply pressure to said thermoplastic material and said subject matter while all of the same is heated, (d) means for cooling the thus formed coherent structure located behind said pressure means, and (e) one pair of rotational means relatively far behind said pressure means to pull said coherent structure through said laminator so that said cooling occurs with said coherent structure having a planar configuration under tension.

References Cited by the Examiner
UNITED STATES PATENTS

| | | | |
|---|---|---|---|
| 2,171,259 | 8/39 | Scott | 156—322 |
| 2,224,370 | 12/40 | Wescott | 156—311 |
| 2,334,485 | 11/43 | Ettl | 156—311 |
| 2,387,631 | 10/45 | Weir | 156—311 |
| 2,392,695 | 2/46 | Rohdin | 156—289 |
| 2,469,972 | 5/49 | Lowry et al. | 154—42 |
| 2,511,703 | 6/50 | Ettl | 156—311 |
| 2,542,901 | 2/51 | Chaffee | 154—42 |
| 2,680,468 | 6/54 | Lewis | 156—583 |
| 2,820,733 | 1/58 | Sorel | 154—118 |
| 2,862,846 | 12/58 | Blackford et al. | 154—118 |

EARL M. BERGERT, *Primary Examiner.*

CARL F. KRAFT, *Examiner.*